Inventor
ALEXANDER J. LEWUS
By Wallace, Kinzer and Dorn
Attorneys

April 21, 1970          A. J. LEWUS          3,508,131
SCR ACTUATED SINGLE-PHASE MOTOR CONTROLS
Filed Sept. 8, 1967                    2 Sheets-Sheet 2

Inventor
ALEXANDER J. LEWUS
By Wallace, Kinzer and Dorn
Attorneys

United States Patent Office 3,508,131
Patented Apr. 21, 1970

3,508,131
SCR ACTUATED SINGLE-PHASE MOTOR CONTROLS
Alexander J. Lewus, Phoenix, Ariz.
Continuation-in-part of application Ser. No. 362,764, Apr. 27, 1964. This application Sept. 8, 1967, Ser. No. 666,433
Int. Cl. H02p 7/62
U.S. Cl. 318—227                                      8 Claims

ABSTRACT OF THE DISCLOSURE

External control circuits for single-phase electric motors of the split-phase, capacitor-start inductance-run, and capacitor-start capacitor-run kinds in which energization of the starting winding is controlled by two signal-controlled rectifiers energized from air-gap sensing transformer having an adjustable magnetic core. In each circuit, the primary winding of the transformer is connected in series with the power circuit for the main or running winding of the motor; in one circuit the transformer has two primaries that are connected in series for high voltage operation and in parallel for low voltage operation of a dual-voltage motor. The sensing transformer has two secondary windings, respectively connected to the gate electrodes of two signal-controlled rectifiers. The two rectifiers are directly connected, in parallel with each other but in opposed polarities, in series with the motor starting winding. The transformer is provided with an adjustable magnetic core to balance and adjust the conduction levels of the two SCR's. No resistance or other impedance is incorporated in the triggering circuits for the SCR's, affording maximum sensitivity and close control of the triggering level of the SCR's. Adjustment of the transformer allows for a limited forward voltage drop across the two SCR's, increasing the dephasing action of the starting circuit and improving the starting torque of the motor.

CROSS-REFERENCES TO RELATED APPLICATIONS

This application is a continuation-in-part of application Ser. No. 362,764 filed Apr. 27, 1964, now abandoned.

BACKGROUND OF THE INVENTION

This invention relates to single-phase motors and more particularly to control circuits for the starting windings of single-phase electric motors of the split-phase, capacitor-start capacitor-run and capacitor-start inductance-run kinds.

Single-phase electric motors are conventionally provided with two windings, mounted in a stator core, inductively coupled to the rotor of the motor. These two windings, constituting a starting winding and a running winding, are angularly displaced from each other, within the stator core, the construction being such that the starting winding is supplied with a leading or resistive current that is displaced by sixty degrees or more electrically with respect to the lagging current in the main winding of the motor. The starting winding is used primarily for starting of the motor. Most frequently, a centrifugally operated switch driven by the motor shaft is used to disconnect the starting winding after the motor has reached a given speed. In some motors, the starting winding remains coupled to the power supply through a fixed running capacitor.

In the operation of conventional single-phase electric motors, whether of the capacitor-start inductance-run, capacitor-start capacitor-run, or split-phase types, one of the most frequent sources of malfunction is the centrifugal switch or other switching device used to disconnect the starting winding from the electrical circuit when the motor is running. If the motor is started and stopped quite frequently, the switch or relay contacts may arc excessively and may deteriorate to a point where the motor will not function properly even though the motor structure itself is good for a much longer life. The switch or relay also may accumulate dust, dirt, and other materials and may eventually jam, preventing effective starting or tending to maintain the starting winding of the motor in circuit after it should be disconnected. In the latter circumstance, the motor may overheat, substantially reducing the life of the motor. Furthermore, the conventional control arrangements for single-phase motors frequently produce substantial difficulties with respect to reversing the direction of rotation of the motor, particularly when the direction of rotation is reversed under load conditions.

Throughout this specification, and in the appended claims, the expression "capacitor-start motor" includes both capacitor-start capacitor-run motors and capacitor-start inductance-run motors.

There have been proposals for the use of signal-controlled rectifiers in the starting circuits of single phase electric motors in place of conventional starting switches. Thus, in Patent No. 3,116,445, two sensing windings are inductively coupled to the main winding of a capacitor-start inductance-run motor, the outputs from the sensing windings being used to trigger two SCR's connected in back-to-back relation in series in the starting winding circuit of the motor. And similar circuits, each using a separate sensing transformer having a primary winding connected in the main motor winding circuit, are shown in Patents Nos. 3,226,620 and 3,071,717. But the circuits proposed in those patents present substantial difficulties with respect to maintenance of adequate sensitivity and accuracy of operation, primarily due to the utilization of substantial resistance, capacitance, or both in the triggering circuits for the SCR's. Moreover, these known circuits, in which the firing levels of the SCR's are controlled by added impedances in their trigger circuits, tend to afford relatively low starting torques in operation of the motors.

SUMMARY OF THE INVENTION

It is an object of the present invention, therefore, to provide a new and improved control circuit for single-phase electric motors, including motors of the split-phase and capacitor-start types, that effectively and inherently eliminates or minimizes the difficulties and disadvantages of previously known control circuits.

A specific object of the invention is to provide a new and improved control circuit for a single-phase electric motor of the capacitor-start or split-phase type that requires no mechanical switching device and that eliminates entirely any switching contacts, thereby precluding maintenance difficulties due to contact arcing and to fouling or other failure of a switch yet at the same time improves the starting torque characteristics of the motor.

A specific object of the invention is to provide a new and improved switching control circuit for the starting winding of a single-phase electric motor using signal-controlled rectifiers as the basic switching devices, that permits practical reversing operation under load conditions.

An additional object of the invention is to afford a control circuit for a single-phase electric motor, in which the principal control elements are signal-controlled semiconductor rectifiers, that is usable for motors having a broad range of operating speeds and operable at different line voltages without requiring any fundamental change in the control circuit with respect to changes in operating voltage or speed.

An additional object of the invention is to provide a new and improved control circuit for a single-phase electric motor of the capacitor-start or split-phase kind that affords improved efficiency and higher pull-in and breakdown torques than more conventional control arrangements.

A particular object of the invention is to afford a new and improved control circuit for the starting winding of a single-phase dual-voltage electric motor that requires no mechanical or electrical connection to the motor other than a direct electrical connection to the starting winding itself.

Accordingly, the invention is directed to a control circuit for a single-phase electric motor including a main winding and a starting winding that are angularly displaced from each other in a stator core, the two windings being inductively coupled to the rotor of the motor. The control circuit of the invention comprises power circuit means for connecting the main winding to a single-phase power supply, together with sensing transformer means coupled to the power circuit means, the sensing transformer means having two secondary windings for developing control signals that are representative of the load current in the main winding of the motor. The control circuit further includes starting circuit means for connecting the starting winding of the motor to the power supply. This starting circuit means includes two signal-controlled semiconductor rectifiers each having input and output electrodes connected in series in the starting circuit. The trigger electrode of each rectifier is directly conductively connected to the secondary winding of the sensing transformer, without substantial impedance, so that the rectifiers are effective to close the starting circuit, in response to the aforementioned control signals, whenever the load current to the main winding of the motor exceeds a first threshold amplitude. The rectifiers are also effective to open the starting circuit whenever the load current falls below a second threshold amplitude; the two threshold amplitudes may be equal to each other but need not be equal. The transformer is essentially an air core transformer with a magnetic core that can be partially inserted to adjust the conduction levels of the two rectifiers.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

BRIEF DESCRIPTION OF THE DRAWINGS

FIG. 1 illustrates, in schematic form, a capacitor-start motor 10 of conventional construction connected in a control circuit 11 comprising one embodiment of the present invention. The motor 10 includes the usual armature 12, which may be of the wound rotor type or may comprise a conventional squirrel cage rotor. The particular construction employed for the rotor, which may be a high resistance or a low resistance type, is not critical to the present invention. For example, armature 12 may be constructed with individually wound wire coils mounted in slots in the usual laminated core structure; it may equally well comprise die cast conductors instead of the wire coils. Armature 12 is, of course, mounted on the usual motor shaft 13.

Figure 1:
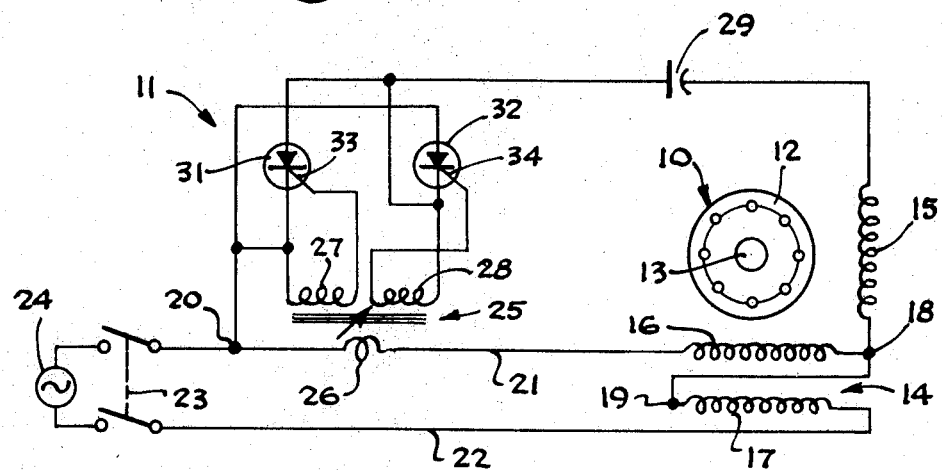
FIG. 1 is a schematic diagram of a single-phase dual-voltage capacitor-start inductance-run motor connected in a control circuit constructed in accordance with one embodiment of the present invention.

Motor 10 further includes the usual field windings comprising a main or running winding 14 and a starting winding 15. In the illustrated construction, running winding 14 is made in two sections 16 and 17, the two winding sections 16 and 17 being equally distributed in the stator core of the motor to produce a uniform magnetic field. Assuming motor 10 to be a 230/115 volt motor, it is seen that the winding sections 16 and 17 are connected in series for 230-volt operation in FIG. 1. The two winding section terminals 18 and 19 are connected together, and one end of the starting winding 15 is connected to terminal 18.

The main winding 14 of motor 10 is connected, by power circuit means comprising a pair of conductors 21 and 22 and a starting switch 23, to a single phase power supply 24. Power supply 24 represents any conventional A.C. power supply. Starting switch 23 is a conventional double-pole single-throw motor starting switch. Of course, the power circuit for the main winding of the motor may include suitable overload protection; moreover, the manually operable switch 23 may be replaced by a suitable electrically operated contactor or other conventional motor starting switch if desired.

The control circuit 11 illustrated in FIG. 1 comprises a sensing transformer 25 having a primary winding 26 and two secondary windings 27 and 28. Sensing transformer 25 is a current transformer, primary winding 26 being connected in series in the conductor 21 that connects the AC supply 24 to the first winding section 16 of the main running winding 14. The secondary windings 27 and 28 of transformer 25 are utilized to develop a control signal that is proportional to the amplitude of the current in power line 21 and hence representative of the load current drawn by the main winding of the motor 10. Transformer 25 is shown as an "iron core" transformer having an adjustable core of magnetic material; preferably, transformer 25 is basically an air core transformer with an adjustably insertable magnetic core as described more fully hereinafter in relation to the embodiment of FIG. 2.

As noted above, motor 10 is a dual-voltage motor shown connected for high voltage operation. To reconnect the motor for low voltage operation terminal 18 is disconnected from terminal 19 and reconnected directly to power line 22. Terminal 19 is then reconnected to terminal 20 on line 21. The connection is made between primary winding 26 and power supply 24 so that current conditions in primary winding 26 are essentially the same as for high voltage operation and low voltage operation.

The control circuit 11 of FIG. 1 further includes a starting circuit for connecting starting winding 15 to power supply 24. Since motor 10 is a capacitor-start motor, a capacitor 29 is connected in series with starting winding 15. Typically, capacitor 29 is an intermittent-duty capacitor, usually an electrolytic capacitor of the kind conventionally employed for starting duty in single-phase motors.

Control circuit 11 further includes two signal-controlled semiconductor rectifiers 31 and 32. Rectifier 31 comprises a silicon signal-controlled rectifier (SCR) having input and output electrodes comprising an anode and a cathode and having a gate electrode 33 for controlling conduction between the anode and cathode of the rectifier. The anode of signal-controlled rectifier 31 is connected to capacitor 29 and the cathode of the rectifier is connected directly to the conductor 21 in the input circuit of the main winding of the motor 10. The gate electrode of rectifier 31 is connected to one terminal of secondary winding 27 of sensing transformer 25, the other terminal of the secondary winding 27 being connected to the cathode of the rectifier.

A similar circuit arrangement is used for the second signal controlled rectifier 32 in control circuit 11, but the polarities are reversed in the circuit for the second gate device. Thus, the anode of the signal controlled rectifier 32 is connected to conductor 21 in the power circuit for the main winding of the motor, the cathode of the rectifier being connected to capacitor 29. The trigger electrode 34 of device 32 is connected to one terminal of the secondary winding 28 of sensing transformer 25. The other terminal of secondary winding 28 is connected to the cathode of the rectifier.

The silicon signal-controlled rectifiers 31 and 32 afford quite desirable operating characteristics insofar as the control circuit of the present invention is concerned. These devices exhibit very low leakage characteristics in the reverse or non-conducting direction; in the forward or conducting direction, conduction is initiated by application of a control signal to the gate of control electrode. When conducting, the devices exhibit a very low voltage drop and high current-carrying capacity.

To start motor 10, switch 23 is closed, connecting the two sections 16 and 17 of main winding 14 in series across the 230-volt A.C. supply 24. The initial inrush of starting current through the primary winding 26 of sensing transformer 25 develops a control signal in the secondary windings 27 and 28 that is of sufficient amplitude to trigger the two gate devices 31 and 32 to conduction. For each half cycle of the supply voltage in which conductor 21 is driven positive with respect to conductor 22, a current pulse is supplied from conductor 21 through the anode-cathode path in device 32 and through capacitor 29 to starting winding 15, the return circuit extending from terminal 18 through running winding section 17 and back to conductor 22. In the alternate half cycles, the current for the starting winding goes from conductor 22 through main winding section 17 and terminal 18 to the starting winding and then through capacitor 29 and the anode-cathode path of gate device 31 back to conductor 21. It is thus seen that starting winding 15 is effectively connected in a complete starting circuit, through the two signal controlled rectifiers 31 and 32, to the same power supply that energizes the main or running winding 14 of the motor.

As motor 10 builds up in EMF and approaches running speed, the current drawn by running winding 14 progressively reduces. When the current through primary winding 26, in the main motor power circuit, drops below a given threshold value, the amplitude of the control signal from secondaries 27 and 28 to gate electrodes 33 and 34 is no longer sufficient to trigger the rectifiers 31 and 32 to conduction. Since the current in the anode-cathode path of each SCR goes to zero in each cycle of the supply current, the signal controlled rectifiers cease conduction and starting winding 15 is cut out of the circuit.

During continuing operation of the motor, if excessive load conditions are encountered the current in the main power circuit 21, 22 for main winding 14 may again become high enough to develop a control signal, in the secondary windings 27 and 28 of sensing transformer 25, having an amplitude sufficient to trigger gate devices 31 and 32 to conductive condition. When this occurs, starting winding 15 is again connected in the circuit until such time as the load current through the running winding drops below the threshold amplitude required for the sensing transformer to trigger the gate devices. In the latter circumstance, the motor again operates with only running winding 14 energized.

The speed of response of control circuit 11 is greatly improved as compared with mechanical switching devices, such as centrifugally actuated starting switches, since the signal controlled rectifiers have no mechanical inertia and the electrical inertia is so low as to be negligible in motor applications. There are no switch contacts to arc and pit and the control circuit cannot fail due to fouling of a switch contact or mechanism by dirt, dust or other foreign matter. The circuit affords improved efficiency with respect to breakdown and starting torques, as illustrated by the specific example set forth hereinafter. Furthermore, a conventional reversing switch, effective to reverse the lead connections to either main winding 14 or starting winding 15 can be readily incorporated in the circuit to permit reversal of rotation under load without adversely affecting in any way the operation of the control circuit.

To afford a more specific example of the invention, and to demonstrate more fully the operating characteristics thereof, certain circuit data are set forth hereinafter for a conventional one horsepower squirrel cage motor of the dual voltage (115/230) type having a rated speed of 1740 r.p.m. and a current rating of 14/7 amperes connected in the circuit of FIG. 1 arranged for 230-volt operation. It should be understood that these data are provided merely by way of illustration and in no sense as a limitation on the invention. The data are derived with motor 10 connected for high voltage operation as described above.

OPERATING VOLTAGES (VOLTS)

|  | Start | Full load | No load |
| --- | --- | --- | --- |
| Winding 15 | 125 | 115 | 116 |
| Winding section 16 | 100 | 115 | 116 |
| Winding section 17 | 132 | 117 | 118 |
| Capacitor 29 | 130 | 0 | 0 |
| Voltage across SCR's 33 and 34 | 75 | 160 | 170 |
| Secondary 27 | .35 | .1 | .05 |
| Secondary 28 | .35 | .1 | .05 |

OPERATING CURRENTS

| Conductor 21, amps | 24 | 7 | 5.75 |
| --- | --- | --- | --- |
| Conductor 22, amps | 37 | 7 | 5.75 |
| Winding 15, amps | 17.5 | 0 | 0 |
| Electrode 33, milliamps | 8.8 | 0.05 | .001 |
| Electrode 34, milliamps | 8.8 | 0.05 | .001 |

Starting torque attained was seven foot-pounds, breakdown torque was ten foot-pounds, and pull-in torque, at half speed, was eight foot-pounds. Rectifiers 31, 32 were type MCR808-5 silicon signal-controlled rectifiers. From the foregoing example, it is apparent that the starting winding is automatically energized and the currents to the two windings 14 and 15 are dephased on starting. At running conditions, winding 15 is cut off by the SCR's 33 and 34, controlled by transformer 26.

In the circuit employed in the foregoing example, the transformer 25 was an air core transformer having a ferrite core adjustably movable into the interior of the concentric transformer windings. Adjustment of the transformer core, as described hereinafter in connection with FIG. 2, allows for effective control of the transformer reluctance, making it possible to achieve optimum operation with respect to the threshold value for triggering of the SCR's 31 and 32. From the data set forth above, it will be observed that there is a substantial voltage drop across electrodes 33 and 34 under starting conditions. This forward voltage drop, preferably maintained at about twenty-five percent or less of the applied voltage, is of substantial assistance in affording improved starting torque with smoother starting. Moreover, high feedback peak voltages are suppressed, avoiding potential damage to the rectifiers. Nevertheless, maximum sensitivity is maintained, which is not possible if any substantial impedance is incorporated in the trigger electrode circuits of the rectifiers.

Figure 2:
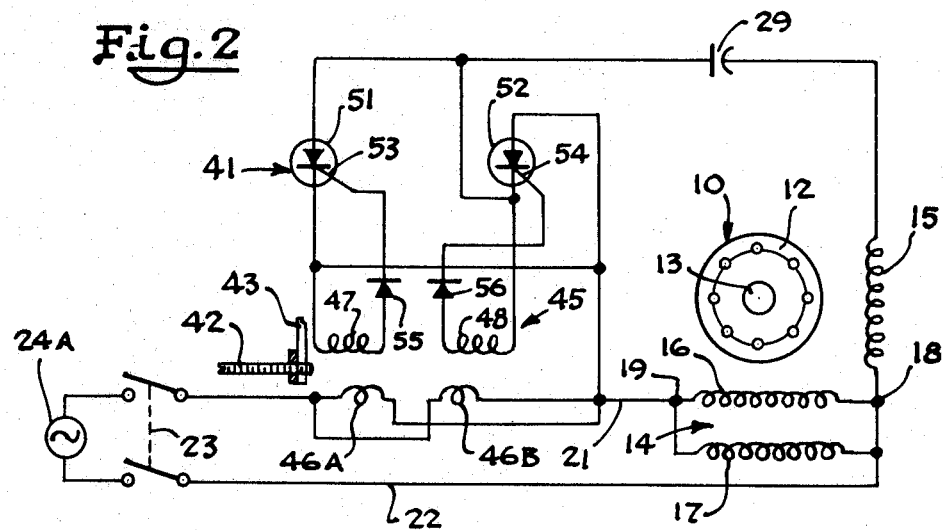
FIG. 2 is a schematic diagram of a dual-voltage capacitor-start inductance-run motor connected in a control circuit constructed in accordance with another embodiment of the present invention.

FIG. 2 illustrates a further embodiment of the present invention in which the single phase motor 10 is controlled by a control circuit 41. Again, motor 10 comprises a wound rotor or a squirrel cage rotor 12 mounted upon a suitable shaft 13, the windings on the armature 12 being inductively coupled to a starting winding 15 and to a running winding 14. As before, the running winding 14 comprises two sections 16 and 17; in this instance, running winding sections 16 and 17 are shown connected in parallel with each other for operation from a 115-volt source, assuming that the motor is rated for 230/115-volt operation. As in FIG. 1, the running winding 14 is connected by a power circuit comprising the conductors 21 and 22 and starting switch 23 to a conventional A.C. source 24A.

The control circuit 41 of FIG. 2 comprises a sensing transformer 45 having two primary windings 46A and 46B connected in parallel with each other and in series with conductor 21 of the main power circuit. It will be seen that the two transformer primaries 46A and 46B can be connected in series with each other, this connection being employed if the running winding sections 16 and 17 are connected in series for operation at 230 volts. In this embodiment, the transformer primaries are always located between the power supply and both sections of main winding 14. As in the previous embodiment, sensing transformer 45 is provided with two secondary windings 47 and 48.

In control circuit 41, two signal controlled rectifiers 51 and 52 are again employed. The anode of rectifier 51 is connected through the capacitor 29 to the starting winding 15 of motor 10, the cathode of the rectifier being returned to conductor 21 in the power circuit. The anode of controlled rectifier 52 is connected to conductor 21 and the cathode is connected to capacitor 29. The gate electrode 53 of device 51 is connected through a diode 55 to one terminal of transformer secondary 47, the other terminal of secondary winding 47 being connected to the cathode of control rectifier 51. Similarly, the gate electrode 54 of control rectifier 52 is connected through a diode 56 to one end of the transformer secondary 48, the other terminal of this transformer secondary being connected to the cathode of control rectifier 52.

In control circuit 41, the core construction used for transformer 45 is specifically illustrated. The transformer is constructed essentially as an air core device but is provided with a magnetic core 42, preferably a ferrite core, that is threaded or otherwise adjustably mounted in a support member 43 that may comprise a bobbin for coils 46A, 46B, 47 and 48. Core 42 can be advanced or retracted to vary the inductive coupling between the primary and secondary windings of the transformer, thereby adjusting the threshold value of load current at which SCR's 51 and 52 are triggered conductive or cut off.

It should be noted that the line connections to SCR's 51 and 52 are made at terminal 19, between transformer primaries 46A, 46B and main winding 14. Consequently, the starting current to winding 15 flows through the sensing transformer primaries, as well as the main motor winding current. The current to winding 15 does not drop off as rapidly as the current to winding 14, but remains relatively constant, so that this circuit arrangement affords more even control characteristics.

Operation of the control circuit 41 illustrated in FIG. 2 is otherwise essentially similar to that of control circuit 11 (FIG. 1) and hence need not be described in detail. The diodes 55 and 56 in the control circuit afford somewhat smoother operation, without introducing substantial impedance into the trigger circuits for the rectifiers. The split primary comprising windings 46A and 46B in sensing transformer 45 make it possible to reconnect motor 10 for 230-volt or 115-volt operation with no substantial delay and with no fundamental change in the control circuit. Thus, the circuit of FIG. 2 operates in much the same manner as that of FIG. 1, except for somewhat smoother action and greater flexibility of adjustment.

Figure 3:
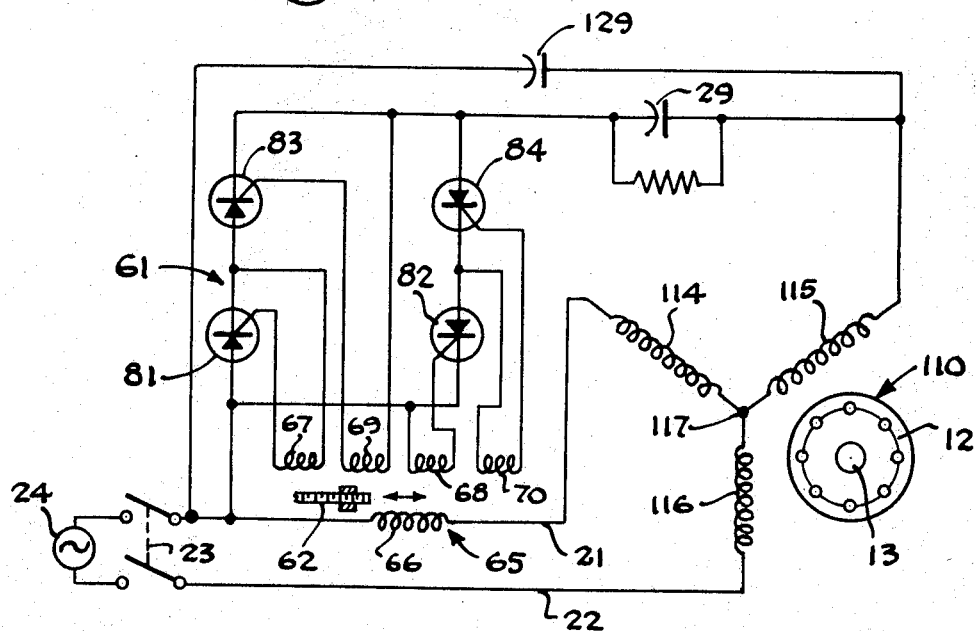
FIG. 3 is a schematic illustration of a capacitor-start capacitor-run control circuit constructed in accordance with another embodiment of the present invention and applied to a three phase motor operated as a single-phase motor.

FIG. 3 illustrates a further embodiment of the invention comprising a control circuit 61 utilized to control the operation of a three-phase motor 110 energized from a single-phase source. As in the previously described embodiments, motor 110 includes a squirrel cage rotor 12 mounted upon the usual shaft 13. In this instance, however, the motor is provided with three field windings 114, 115 and 116 shown connected in a Y configuration at a common terminal 117; a delta connection could also be utilized. In operation of motor 110, field winding 115 is employed as a starting winding and winding 114 functions as a main motor winding. Field winding 116 comprises a winding common to both starting and running operations as described more fully hereinafter.

The series combination of windings 114 and 116 is connected across a suitable AC power supply 24 by power circuit means comprising the two conductors 21 and 22 and the starting switch 23. One terminal of winding 115 is connected to the center terminal 117 of the motor windings; the other terminal of winding 115 is connected back to power line 21 through a running capacitor 129. The same terminal of winding 115 is connected back to conductor 21 through a starting capacitor 29 and the control circuit 61.

Control circuit 61, as shown in FIG. 3, comprises a sensing transformer 65 having a primary winding 66 connected in series with the power circuit conductor 21. The sensing transformer includes four secondary windings 67, 68, 69 and 70, each of which develops a control signal having an amplitude proportional to the amplitude of the load current to the main winding 114 of the motor. Preferably, the transformer windings 66–70 are all wound concentrically with respect to each other. A ferrite or other magnetic core 62 is aligned with the common axis of the transformer windings and is adjustably movable into and out of the air space within the windings to adjust the inductive coupling between the primary winding 66 and all of the secondary windings 67–70.

Control circuit 61 further includes four signal-controlled semiconductor rectifiers 81, 82, 83 and 84, preferably silicon rectifiers. Rectifiers 81 and 83 are connected with their anode-cathode discharge paths in series with each other between conductor 21 and starting capacitor 29. The trigger or gate electrode for rectifier 81 is connected to one terminal of the secondary winding 67 of transformer 65 and the other terminal of winding 67 is returned to the cathode of the rectifier. Similarly, the trigger electrode of rectifier 83 is connected to one terminal of transformer winding 69 and the other terminal of that transformer winding is connected back to the cathode of the rectifier.

The circuit for rectifiers 82 and 84 is similar to that for rectifiers 81 and 83 except that the polarities are reversed. Thus, rectifiers 82 and 84 are connected in series with each other between conductor 21 and starting capacitor 29. The trigger circuit for rectifier 82 comprises the secondary winding 68 of sensing transformer 65, connected between the gate electrode and the cathode of the rectifier. Sensing transformer winding 70 is similarly connected in a triggering circuit for rectifier 84.

In most respects, the operation of control circuit 61 of FIG. 3 is generally similar to the control circuits 11 and 41 described above in connection with FIGS. 1 and 2. At starting, on half cycles of one polarity, the control signals from transformer secondaries 67 and 69 render rectifiers 81 and 83, respectively, conductive. On each half cycle of the opposite polarity, the control signals from secondary windings 68 and 70 trigger rectifiers 82 and 84, respectively, to conductive state. Accordingly, it is seen that the control signals from the secondary windings of transformer 65 gate the rectifiers to complete a starting circuit, through starting capacitor 29, to winding 115. This starting circuit is maintained in operation, continuously energizing starting winding 115, until motor 110 approaches normal running speed, with the usual reduction in total current to the motor winding 114. When a given threshold value of current is reached, the control signals from the secondary windings of transformer 65 are no longer of sufficient amplitude to drive the signal-controlled rectifiers to conduction, so that the starting circuit comprising capacitor 29 is effectively disabled. The running capacitor 129 remains in circuit at all times, since motor 110 in the circuit arrangement of FIG. 3 is a capacitor-start capacitor-run motor.

The circuit arrangement shown in FIG. 3 is particularly suitable for high voltage operations. The use of two series connected rectifiers in each branch of the control circuit for starting capacitor 29 makes it practical to use rectifiers having lower voltage ratings than would otherwise be possible. Nevertheless, all of the rectifiers are accurately and effectively controlled by a relatively simple single transformer. With a concentric transformer winding construction as described above, the triggering levels of all four rectifiers can be adjusted simultaneously to balance the circuit and to provide accurate triggering at the required threshold levels. If desired, a resistor may be connected in parallel with starting capacitor 29 to discharge the capacitor and to prevent a high voltage discharge when starting or reversing the motor. However, the use of a resistor in this portion of the circuit does not adversely affect the sensitivity of the control circuit operation, as would be the case with any substantial impedance connected in the triggering circuits for the signal-controlled rectifiers.

Figure 4:
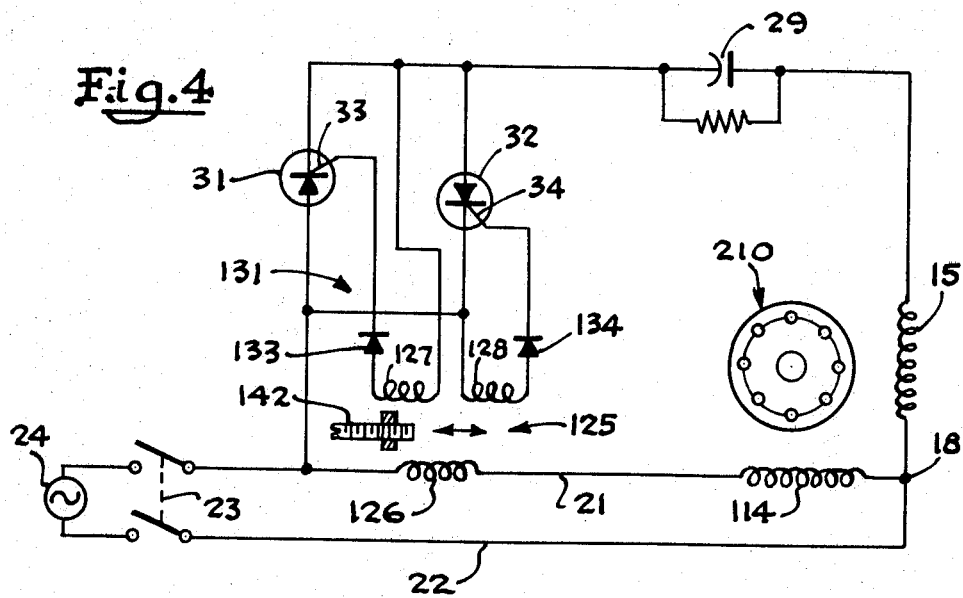
FIG. 4 is a schematic circuit diagram of a capacitor-start inductance-run motor in a control circuit constituting yet another embodiment of the invention.

FIG. 4 illustrates a control circuit 111 for a single-voltage phase motor 210, the basic circuit arrangement being substantially similar in many respects to the construction shown in FIG. 1. Motor 210 comprises the usual armature 12 mounted upon a shaft 13, the armature windings being inductively coupled to a starting winding 15 and to a single-voltage running winding 114. Windings 15 and 114 are connected together at the terminal 18. The running winding 114 is connected across a suitable power supply 24 by means of a power circuit comprising a starting switch 23 and the power conductors 21 and 22.

Control circuit 131, which is utilized to couple starting winding 15 back to the power line 21, comprises a pair of signal-controlled silicon rectifiers 31 and 32 having gate electrodes 33 and 34 respectively. The anode of rectifier 31 is connected through a starting capacitor 29 to starting winding 15 and the cathode is returned to power line 21. The connections for rectifier 32 are reversed; the cathode is connected to starting capacitor 29 and the anode is returned to power line 21.

Control circuit 131 further includes an air core transformer 125 having a primary winding 126 that is connected in series with power line conductor 21. The transformer includes two secondary windings 127 and 128. One terminal of winding 127 is connected to the cathode of rectifier 31 and the other terminal of the winding is connected through a diode 133 to the gate electrode 33 of the signal controlled rectifier. Winding 128 has one terminal connected to the cathode of a gate device 32. The other terminal of winding 128 is connected through a diode 134 to the gate electrode 34. A ferrite or other adjustable magnetic core 142 is again provided for transformer 125.

Operation of control circuit 131 of FIG. 4 is essentially similar to control circuits 11 and 41 of FIGS. 1 and 2. When switch 23 is closed, the inrush of starting current to motor 210 produces a relatively high voltage across the primary winding 126 of transformer 125. As a consequence, high-amplitude control signal voltages are supplied to the gate electrodes 33 and 34 of the signal-controlled rectifiers 31 and 32 through windings 127 and 128, respectively, of the sensing transformer. The two gate devices 31 and 32 are thus triggered to conduction, effectively connecting starting winding 15 to the power supply, through capacitor 29.

As the split-phase motor 210 builds up in EMF and approaches running conditions, the current through the transformer primary 126 is progressively reduced. At a given threshold value, determined by the turns ratio of the sensing transformer (a ratio of 1:9) is typical and the position of core 142, the signal voltages supplied to gate device 31 and 32 fall below the amplitudes necessary to trigger the gate devices to conductive condition. Since the current through the anode-cathode path of each of the gate devices goes to zero on each cycle, the gate devices are rendered nonconductive and starting winding 15 is effectively cut off. Thereafter, motor 210 continues in operation with only main winding 114 energized until such time as the operating conditions of the motor (or restarting) produce a high enough current through primary winding 126 to again trigger gate device 31 and 32 to conduction.

In considering the embodiments of the invention described hereinabove, it should be understood that individual features of the separately illustrated circuits may readily be combined with those of other circuits to afford a variety of different embodiments of the invention. The several circuit arrangements illustrated for capacitor-start inductance-run motors (FIGS. 1, 2, and 4) can all be used for capacitor-run operation, with a continuous duty condenser connected across the control circuit in parallel relationship with respect to the intermittent duty starting capacitor. Furthermore, the control circuits of the invention may be incorporated in apparatus for control of single-phase capacitor-type motors of the kind described in Patent No. 3,036,255 to Alexander J. Lewus, issued May 22, 1962. Of course, it will be apparent that circuits illustrated as applied to capacitor-start motors may also be utilized with split-phase motors.

All of the embodiments of the present invention as described above eliminate any requirement for mechanical switching devices, thereby avoiding any maintenance difficulties due to contact arcing and to fouling or other failure of the switches. The speed of response of these circuits is much higher than afforded by either relays or centrifugal switches. Any of the circuit arrangements may be easily and conveniently arranged for reversal of rotation of the motor under load conditions. The control circuits of the invention are applicable either to capacitor-start or split-phase motors. Moreover, these control circuits may be constructed to afford better pull-in and breakdown torque characteristics, for a given motor, than may be conveniently achieved with known switching arrangements, including previously known SCR control circuits. The use of direct conductive connections in the triggering circuits for the signal-controlled rectifiers, with no appreciable added impedances, materially enhances the sensitivity of control. The basic air core transformers employed, with limited magnetic core adjustment, afford effective control of the SCR trigger thresholds and allow maintenance of the desirable forward voltage drops across the rectifier gate electrodes.

Hence, while preferred embodiments of the invention have been described and illustrated, it is to be understood that they are capable of variation and modification.

I claim:
1. An external control circuit for a single-phase electric motor of the split phase or capacitor-start kinds, including a main winding and a starting winding angularly displaced from each other in a stator core and inductively coupled to a rotor, comprising:
  power circuit means for connecting said main winding to a single-phase power supply;
  an air core sensing transformer, comprising a primary winding connected in series in said power circuit means and a secondary winding inductively coupled to said primary winding, for developing a control signal representive of the load current to the main winding of the motor;
  starting circuit means, for connecting said starting winding to the power supply whenever the load current to said main winding exceeds a first threshold amplitude and for effectively disconnecting said starting winding from said power supply whenever the motor load current falls below a second threshold amplitude;

said starting circuit means including two signal-controlled semiconductor rectifiers each having input, output, and gate electrodes, said input and output electrodes of each rectifier being connected in series in said starting circuit means with the rectifiers in opposed polarity relation;

said starting circuit means further including a conductive connection of minimal impedance from said gate electrode of each rectifier to said secondary winding of said sensing transformer means for applying said control signal to said gate electrodes at full amplitude to actuate said rectifiers between conductive and nonconductive conditions.

2. An external control circuit for a single-phase electric motor according to claim 1 in which said sensing transformer windings are concentric about a central opening and further including a magnetic core mounted for adjustable advancement and retraction into and out of the central opening of the transformer to vary the inductive coupling between the primary winding and the secondary windings.

3. An external control circuit for a single-phase electric motor of the split phase or capacitor-start kinds, including a main winding having two winding sections connectible in series for high voltage operation and in parallel for low voltage operation, and a starting winding, said main and starting windings being angularly displaced from each other in a stator core and inductively coupled to a rotor, said control circuit comprising:

power circuit means for connecting said main winding to a single-phase power supply;

a sensing transformer, comprising a primary winding connected in series in said power circuit means and a secondary winding inductively coupled to said primary winding, for developing a control signal representative of the load current to the main winding of the motor;

said primary winding comprising two winding sections connectible in series for high voltage operation and in parallel for low voltage operation of said motor;

starting circuit means, for connecting said starting winding to the power supply whenever the load current to said main winding exceeds a first threshold amplitude and for effectively disconnecting said starting winding from said power supply whenever the motor load current falls below a second threshold amplitude;

said starting circuit means including two signal-controlled semiconductor rectifiers each having input, output, and gate electrodes, said input and output electrodes of each rectifier being connected in series in said starting circuit means with the rectifiers in opposed polarity relation;

said starting circuit means further including a conductive connection of minimal impedance from said gate electrode of each rectifier to said secondary winding of said sensing transformer for applying said control signal to said gate electrodes at full amplitude to actuate said rectifiers between conductive and nonconductive conditions.

4. A control circuit for a single-phase electric motor according to claim 3 in which said secondary winding of said sensing transformer comprises two independent sectional windings, each connected to a respective one of said rectifiers.

5. An external control circuit for a single-phase electric motor according to claim 3 in which said sensing transformer includes four secondary windings, and further comprising two additional signal-controlled rectifiers each individually connected in series with a respective one of said rectifiers in said starting circuit means, each secondary winding of said transformer being individually connected to the gate electrode of a respective one of said rectifiers.

6. An external control circuit for a single-phase electric motor according to claim 3 in which all of said transformer windings are concentric about a central opening and further including a magnetic core mounted for adjustable advancement and retraction into and out of the central opening of the transformer to vary the inductive coupling between the primary and secondary windings.

7. An external control circuit for a single-phase electric motor of the split phase or capacitor-start kinds, including a main winding and a starting winding angularly displaced from each other in a stator core and inductively coupled to a rotor, comprising:

power circuit means for connecting said main winding to a single-phase power supply;

a sensing transformer, comprising a primary winding connected in series in said power circuit means and for individual secondary windings each inductively coupled to said primary winding, for developing in each secondary winding a control signal representative of the load current to the main winding of the motor;

starting circuit means, for connecting said starting winding to the power supply whenever the load current to said main winding exceeds a first threshold amplitude and for effectively disconnecting said starting winding from said power supply whenever the motor load current falls below a second threshold amplitude;

said starting circuit means including a first pair of signal-controlled semiconductor rectifiers each having input, output, and gate electrodes, said input and output electrodes of each rectifier being connected in series with each other in said starting circuit means with the rectifiers in like polarity relation;

said starting circuit means further including a second similar pair of signal-controlled semiconductor rectifiers similarly connected in series with each other in said starting circuit means but in opposed polarity relation with respect to said first pair of rectifiers;

said starting circuit means further including a conductive connection of minimal impedance from said gate electrode of each rectifier to a respective one of said secondary windings of said sensing transformer means for applying said control signal to said gate electrodes at full amplitude to actuate said rectifiers between conductive and nonconductive conditions.

8. An external control circuit for a single-phase electric motor according to claim 7 in which all of said transformer windings are concentric about a central opening and further including a magnetic core mounted for adjustable advancement and retraction into and out of the central opening of the transformer to vary the inductive coupling between the primary winding and the secondary windings.

References Cited
UNITED STATES PATENTS

| | | | |
|---|---|---|---|
| 3,071,717 | 1/1963 | Gordon | 318—221 |
| 3,226,620 | 12/1965 | Elliott et al. | 318—221 |

ORIS L. RADER, Primary Examiner

G. RUBINSON, Assistant Examiner

U.S. Cl. X.R.,
318—221